United States Patent [19]

Gelardi et al.

[11] Patent Number: 5,694,243
[45] Date of Patent: Dec. 2, 1997

[54] SLIDING BINOCULAR BODY

[75] Inventors: John A. Gelardi, P.O. Box 714, Kennebunkport, Me. 04046; Anthony L. Gelardi, P.O. Box 213, Cape Porpoise, Me. 04014; Arthur P. Becker, New York, N.Y.; Benjamin A. Wells, Lincoln, Mass.

[73] Assignees: BNOX, Inc., New York, N.Y.; John A. Gelardi, Kennebunkport; Anthony L. Gelardi, Cape Porpoise, both of Me.

[21] Appl. No.: 733,121

[22] Filed: Oct. 16, 1996

Related U.S. Application Data

[63] Continuation of Ser. No. 339,781, Nov. 15, 1994, Pat. No. 5,604,631, which is a continuation of Ser. No. 230,525, Apr. 20, 1994, abandoned.

[51] Int. Cl.[6] .................... G02B 13/00; G02B 7/182; G03B 13/08
[52] U.S. Cl. .................... 359/431; 359/407; 359/409; 359/850; 359/871; 396/432; 396/386
[58] Field of Search .................... 359/402–418, 359/425, 431, 480–482, 503–506, 801–812, 838, 850, 856–857, 861, 871, 879; 396/373–386, 141–144, 432

[56] References Cited

U.S. PATENT DOCUMENTS

| | | | |
|---|---|---|---|
| 1,533,248 | 4/1925 | Hawix | 359/835 |
| 2,284,562 | 5/1942 | Dittman | 396/386 |
| 2,424,283 | 7/1947 | Miles | 359/431 |
| 2,481,409 | 9/1949 | Glauser | 359/425 |
| 2,882,791 | 4/1959 | Moller et al. | 359/363 |
| 2,933,026 | 4/1960 | Wizenburg | 396/432 |
| 3,062,098 | 11/1962 | Dowling et al. | 359/412 |
| 3,076,382 | 2/1963 | Dowling et al. | 359/412 |
| 3,244,072 | 4/1966 | Dowling et al. | 359/412 |
| 3,409,343 | 11/1968 | Zapp | 359/431 |
| 3,597,041 | 8/1971 | Frantz | 359/410 |
| 3,642,345 | 2/1972 | Akin, Jr. et al. | 359/511 |
| 3,690,214 | 9/1972 | Ataka | 396/386 |
| 3,733,132 | 5/1973 | Leighton | 356/138 |
| 3,744,872 | 7/1973 | Akin, Jr. et al. | 359/414 |
| 3,829,194 | 8/1974 | Van Exel et al. | 359/417 |
| 3,857,643 | 12/1974 | Bardocz | 359/503 |
| 3,957,358 | 5/1976 | Holliday | 359/804 |
| 3,985,421 | 10/1976 | Beecher | 359/414 |
| 4,013,340 | 3/1977 | Mukai et al. | 359/417 |
| 4,013,341 | 3/1977 | Riley | 359/408 |
| 4,067,027 | 1/1978 | Yamazaki | 396/432 |
| 4,100,555 | 7/1978 | Johnson | 396/373 |
| 4,140,567 | 2/1979 | Beecher | 156/228 |
| 4,392,710 | 7/1983 | Rogers | 359/365 |

(List continued on next page.)

FOREIGN PATENT DOCUMENTS

| 63-186208 | 8/1988 | Japan | 359/480 |
|---|---|---|---|
| 4280241 | 10/1992 | Japan | 396/373 |

*Primary Examiner*—Thong Nguyen
*Attorney, Agent, or Firm*—Abelman, Frayne & Schwab

[57] ABSTRACT

A sliding binocular body has two optical assemblies which slide on an intermediate plate to adjust for intraocular distance and which slide closed. Two shells are joined to form one assembly. Front and back contour plates cover the assembly. A field and eye lens holder slides into the box through the back plate. An eye piece is attached to the lens holder. Inward horizontal surfaces have inward extending rails, which engage outward facing grooves on the intermediate plate. The two shells are secured together and joined to the intermediate plate before mirrors are slid and clamped into place. The objective lenses are placed in position, and the contour plates are sealed in place. The eye lens and field lens are inserted in the holders before the holders are inserted in the assemblies. The assemblies hold and clamp mirrors against fixed reference surfaces. Objective lens holders formed in the assemblies permit vertical or horizontal adjustment of an objective lens before its fixing. The intermediate plate has vertical projections on opposite ends which fit into recesses in the inward surfaces of the assemblies to limit outward travel and to hold the assemblies in closed position. The contour cover plates have projections to trap, or transparent extensions to cover, graphic skins or advertising paper boards or wraps.

4 Claims, 12 Drawing Sheets

U.S. PATENT DOCUMENTS

| | | | |
|---|---|---|---|
| 4,445,766 | 5/1984 | Yamazaki | 396/432 |
| 4,488,790 | 12/1984 | Beecher | 359/407 |
| 4,545,655 | 10/1985 | Fantone et al. | 359/402 |
| 4,648,574 | 3/1987 | Granlund | 248/918 |
| 4,758,077 | 7/1988 | Beecher | 359/407 |
| 4,848,887 | 7/1989 | Addy et al. | 359/413 |
| 4,877,318 | 10/1989 | Miles et al. | 359/431 |
| 4,936,667 | 6/1990 | Rohr et al. | 359/412 |
| 4,955,702 | 9/1990 | Nakamura | 359/418 |
| 4,999,658 | 3/1991 | Kamitani et al. | 396/386 |
| 5,054,886 | 10/1991 | Ozaki et al. | 359/823 |
| 5,299,066 | 3/1994 | Rombult | 359/819 |
| 5,335,110 | 8/1994 | Shin | 359/473 |
| 5,347,397 | 9/1994 | Nelson et al. | 359/402 |
| 5,604,631 | 2/1997 | Gelardi et al. | 359/409 |

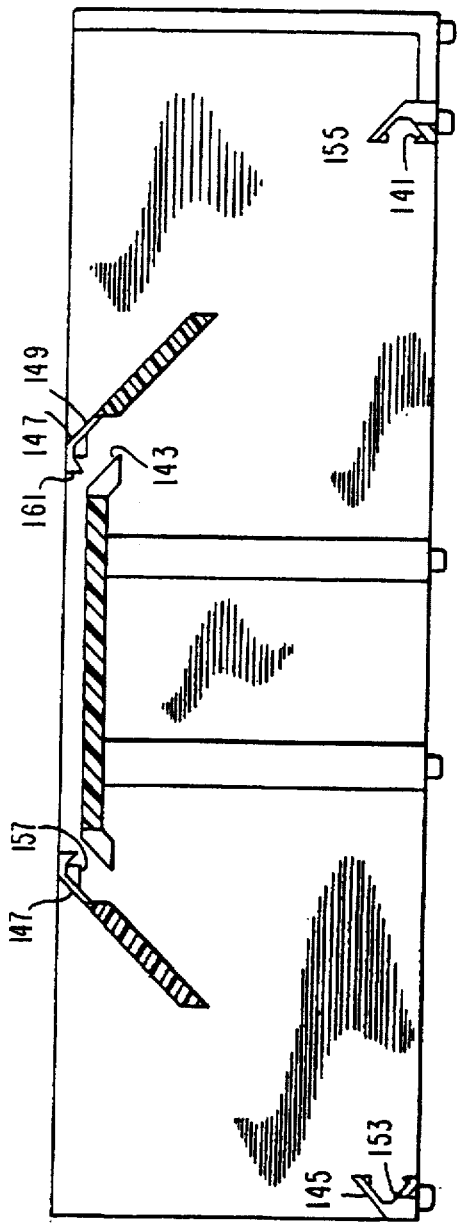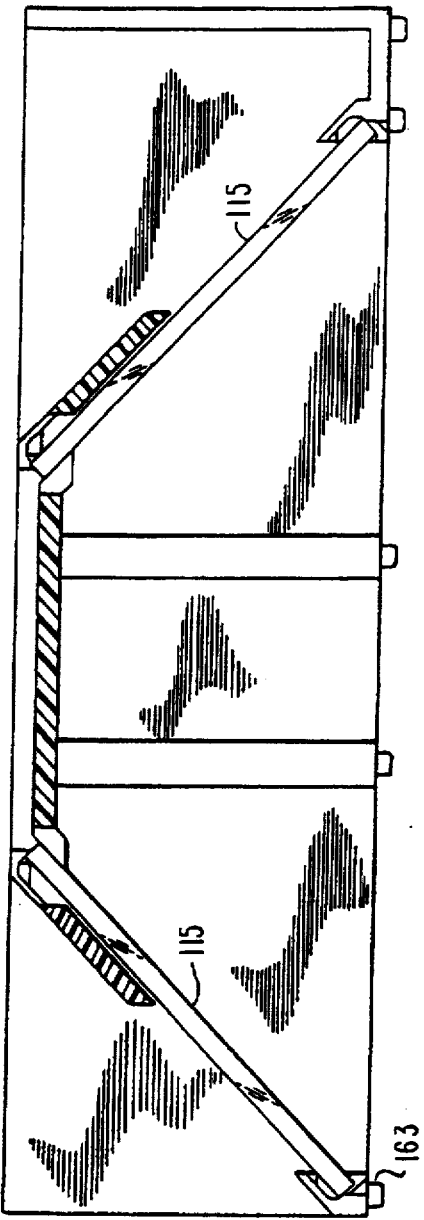

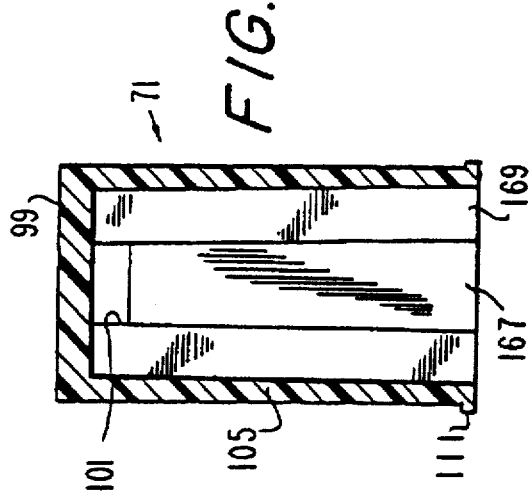
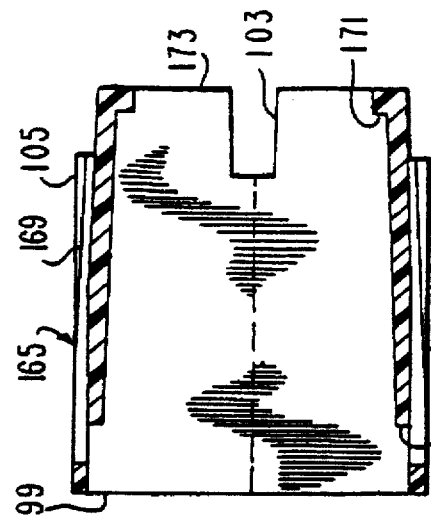
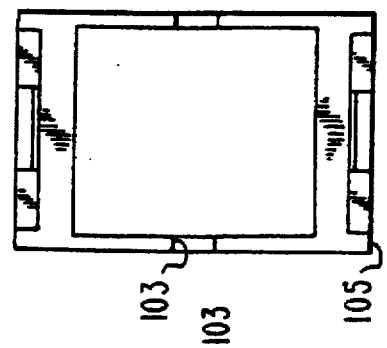
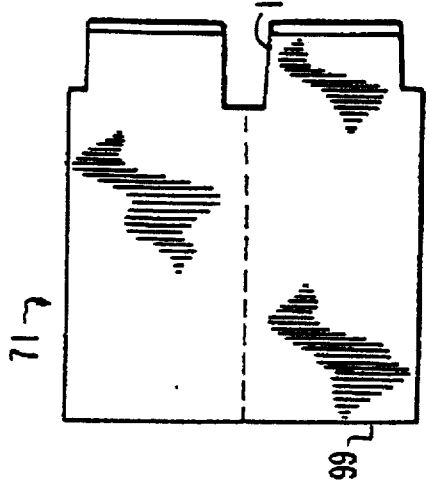

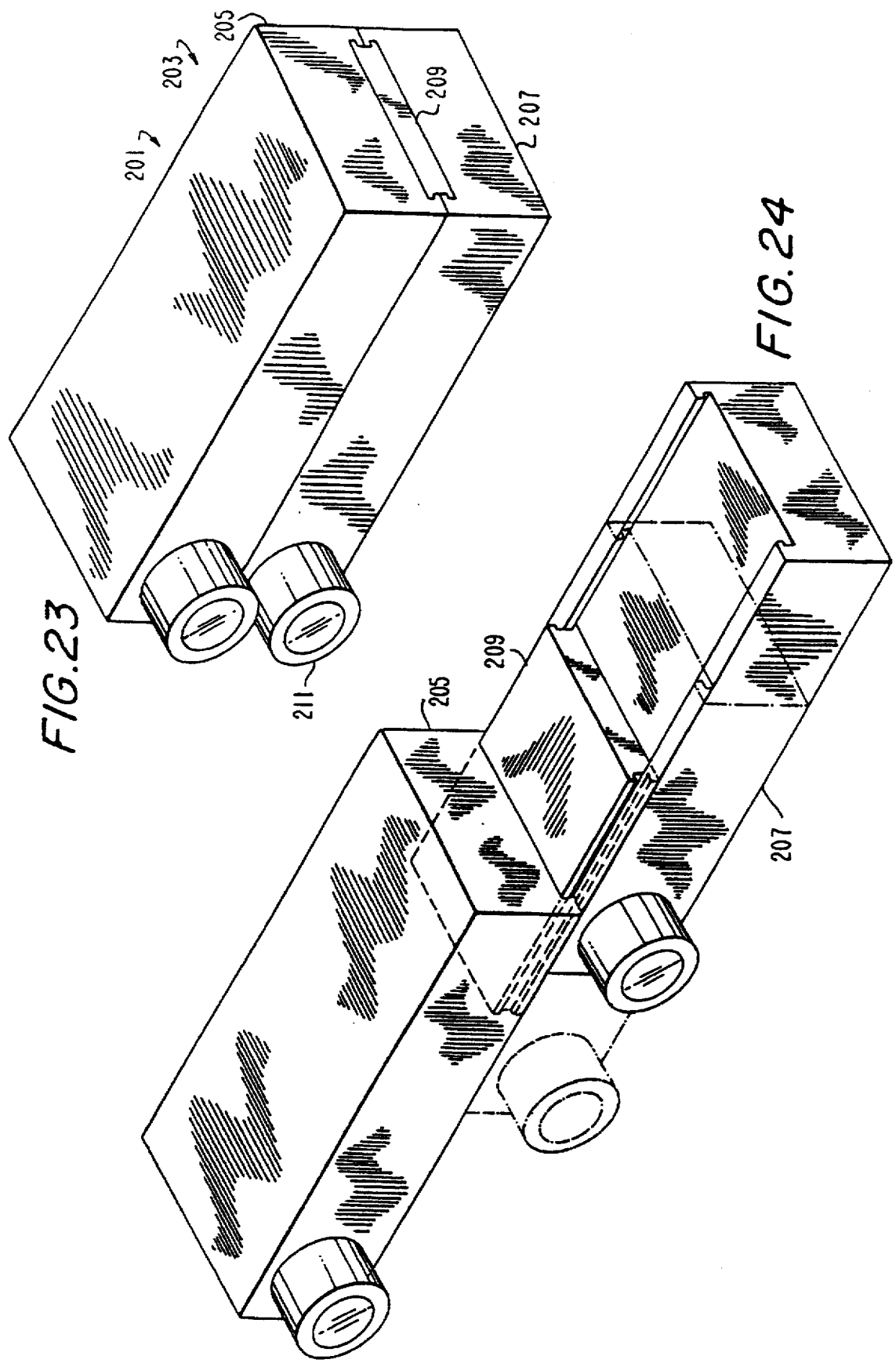

SLIDING BINOCULAR BODY

This is a Division of application Ser. No. 08/339,781, filed Nov. 15, 1994, now U.S. Pat. No. 5,604,632, which is a Continuation of now abandoned Ser. No. 08/230,525, filed Apr. 20, 1994.

BACKGROUND OF THE INVENTION

1. Field of the Invention

This invention relates to optical housing assemblies, particularly a low cost, light weight housing for binoculars in which a) the interpupillary distance is adjusted by sliding movement between two optically coordinated monocular housings and b) the optical path in each monocular housing includes mirrors between the objective lens and eyepiece.

2. Description of the Prior Art

Sporting events, athletic and outdoor activities often take place at a significant distance from a spectator. Optical magnification devices, especially binoculars and field glasses, have been proposed and designed to enable a spectator to more clearly view such activities. However, these devices have certain practical drawbacks in providing a clearer, closer view of an event, particularly if a light weight, inexpensive, but effective product is desired.

Dual-path optical systems are well-known in the optical arts and include two general classes of devices, a) binoculars and field glasses (collectively binoculars), and b) biocular devices include any instrument in which both eyes are used to view an image to achieve stereoscopic effects or to facilitate observation. They are characterized by having two mechanically linked, but optically uncoupled optical paths, to provide separate twin inputs and outputs to the visual system. Stereoscopic perspective is, more or less, commonly present in such devices so that an observer sees objects from slightly different points of view to permit the perception of depth and dimension.

The most common biocular devices are those which are designed so that both eyes view an object through a single objective lens, i.e., there is a single input and a twin output. They are different from binocular devices in that whereas binocular devices send different images to both eyes, biocular devices send the same image to both eyes. Examples of biocular devices are shown and described in U.S. Pat. No. 4,392,710.

In both biocular and binocular devices, proper image orientation and proper image alignment is normally desired and achieved through the use of elaborate erecting systems in conjunction with suitable objectives and eyepieces.

In general, binoculars fall into two categories, expensive prismatic devices and less expensive, non-prismatic devices. Prismatic devices use prisms to invert the image. They tend to provide high levels of magnification and clarity. The optical system commonly used in prism binoculars comprises double Porro prisms in conjunction with modified Erfle eyepieces and achromatic doublet objectives. Such systems are relatively expensive and difficult to fabricate because of the tolerances required in manufacture and alignment of the various components, especially the prisms, where angular errors can be introduced at each surface.

Thus binoculars which contain prisms are relatively expensive and due to the use of large glass components, heavy. They are cumbersome to carry, often being worn around the neck of the user on a strap or kept in a case until ready for use. Also, the expense of these binoculars may cause a sense of apprehension in using them for just any event. For these reasons, prismatic binoculars are often not taken to sporting events or athletic activities.

Non-prismatic binoculars, generally referred to as opera glasses, utilize a pair of Galilean telescopes. Galilean telescopes do not require an image inverting device, and are thus potentially very inexpensive. However, the exit pupil of the Galilean telescope is coplanar with the eye lens. The lack of eye relief, greatly limits the usable field of view. Thus, opera glasses are generally produced with magnification, in the range of 2–3×. While high power Galilean telescopes may be produced, the very small usable field of view makes them of limited utility for general use.

Consequently, there is a need for a moderate power, high image quality binocular that is relatively inexpensive so that it may be retailed to a large segment of the population for use at popular attractions such as theater, concert, and sporting events.

High quality optical elements exist with precise flatness in mirrors. Precision curvatures in lenses provide excellent resolution in optical systems in cameras, binoculars and projectors, and in other image reducers, expanders and reproducers.

High quality optical objective and eyepiece lenses and mirrors are currently available at low cost. To use those low cost lenses and mirrors in optical equipment and to provide the resolution, of which those low cost elements are possible requires precision in their placement within the housings containing the optical system.

It has also been previously known to replace the prisms in binoculars with flat mirrors. Such binoculars are typically shown in Beech, U.S. Pat. Nos 3,985,421, 4,488,790 and 4,758,077. Recognizing the need to initially position and maintain a high degree of accuracy in the placement of all the optical components, as well as to permit subsequent adjustment for the user's individual eyesight and interpupillary spacing, the housings for such prior binoculars having a high image quality and at least a moderate degree of magnification have been relatively complex and expensive.

To obtain good resolution and to fully use the capabilities of the optical systems, precise light paths must be established and maintained between the elements. The disclosed binocular optical system includes four mirrors in the optical path of each monocular housing.

The housings must be mechanically linked together for precise adjustment of interpupillary distance but are otherwise optically uncoupled in that each represents an independent optical path for the associated eye, not sharing any optical components with the other.

As a consequence of the overall architecture, mirror arrangements, and size of optical lens elements used, the interpupillary distance is adjustable with a generally horizontal rectilinear sliding action while at the same time maintaining proper optical alignment between the otherwise uncoupled optical paths corresponding to the left and right eyes. Moreover, provision is made for movement of one or more of either the objective lenses or eyepieces to provide for proper alignment between the left and right eye paths.

Misalignment of optical paths or a slight variation in lengths of optical paths between lenses may greatly reduce the resolution and image qualities of which the optical elements are capable. Thus, some adjustment should be provided to properly orient the two light paths. The housings must also be capable of restricting ambient light which might interfere with the internal light paths.

Compact binoculars have been proposed in which elements of the binoculars are movable outward to a usable position and inward to a stored position to reduce the size for carrying.

Outward and inward movement require fine definition of bearing surfaces and the use of expensive bearing materials to maintain perfect alignment between the optical paths in the binoculars.

A need exists for a low cost, high precision housing for precise positioning of the multiple optical elements forming the optical path. A further need exists for such a housing to include a low cost and easily manipulated bearing adjustment means which will allow (a) outward and inward positioning of the optical elements and (b) the interpupillary distance to be varied in a binocular having optical paths which are being maintained in precise alignment.

SUMMARY OF THE INVENTION

The present invention relates to binoculars which are inexpensive, have high magnification relative to their size and weight and have high resolution and clarity relative to cost. The binoculars are also compact and collapsible, facilitating easy transport. The invention is modular in construction. The housing substructure is of a modular configuration and lends itself to mass production, rapid design changes, and a multiplicity of different covering configurations over its outer skin. A common mold may be used to form various parts of the invention. The mold may be easily altered to change design and may be employed in mass production line service. A variety of outer housing coverings may preferably be placed over the operative housings.

The optical system within the housing uses modern, lightweight mirrors to provide a long focal length in a compact housing. The mirrors are inexpensive in comparison to prisms yet they provide excellent clarity, resolution and magnification. The mirrors are accurately positioned and arranged so that light entering the binoculars follows a predetermined light path. Preferably, the mirrors are rectilinear in configuration, as are the lenses of the binoculars.

The present invention houses an optical system which permits the adjustment for the interpupillary distance in a horizontal, linearly sliding fashion. This method of interpupillary ocular adjustment will maintain the base of the rectilinear lenses within the eyepiece parallel with the ground at all interpupillary distances, whereas conventional binoculars alter interpupillary distance using a pivot design which rotates the lenses in response to the interpupillary adjustment.

The housing, in a preferred embodiment, comprises two L-shaped monocular assemblies slidably connected by, and riding upon an intermediate plate along opposed horizontal surfaces of each L-shaped assembly. This plate arrangement permits the interpupillary distance adjustment and the closing of the housing into a small assembly during non-use. In its stored position, the binocular is compact with no protruding appendages or edges, resulting in an easily portable and pocketable device. Although neck straps and cases can be provided, they are not necessary. The L-shaped optical assemblies, when in an open position, provide a bridge for testing the device on the nose of a user, addition comfort and stability during use.

As a result, highly compact optical and binocular housings of lightweight constructions, are provided with precise, yet relatively inexpensive lens and mirror positioning features. The present invention provides precise sliding positioning of two optical assemblies with a minimum of weight and a maximum of accuracy in maintaining optical path alignment.

As discussed below in greater detail, two major shell pieces are joined to form one assembly. The main shell pieces are preferably constructed so that they are similar when inverted and reversed to form the opposite assembly. In assembling each of the two monocular housings which form the binocular, the two main shell pieces are secured together and sealed. The mirrors are then slid and clamped into place. A rear contour plate is sealed in place against the rear shell, the objective lens is placed in position, and a front contour plate is sealed in place against the from shell.

The eye lens and field lens are inserted in the eyepiece holders before the eyepiece holders are inserted in the assembly. The contour plates of the housing assemblies include surfaces which rest against the clamped mirrors to accurately hold the mirrors in precise fixed reference positions. Objective lens holders formed in one assembly permit vertical or horizontal adjustment of the objective lens before fixing it in place.

An intermediate plate slidably connects the two monocular housing units. The intermediate plate allows the two optical assemblies to move inwardly and outwardly in a generally horizontal direction to adjust to the user's interpupillary distance while maintaining optical alignment. Rails formed by mating shell halves slide in common recesses in the intermediate plate which are shared by rails of both optical assemblies.

The intermediate plate advantageously allows the two optical monocular housing assemblies to move to an open position while providing stability. Without the intermediate plate, the overlapping sections would normally become unstable and vulnerable to breaking or to losing optical alignment.

The intermediate plate and rail connections hold parallel alignments and prevent the optical paths from converging or diverging when the optical assemblies are moved from a closed position to an open position, or anywhere in between.

The front and rear outer contour plates can be snapped, glued, welded or attached by mechanical means to each other or directly to the outer surface of the optical assemblies, encapsulating the optical assemblies and preventing unwanted ingress of light.

The contour plates partially or wholly create outer skins on outer surfaces of the optical assemblies and preferably contain securement means that allow graphic and outer skins to be secured over the optical housing assemblies. The contour plates also preferably include protective edge covering that protect the edges of the overlying graphic sheets or skins, and permit graphic sheets or skins to be inserted under portions of the contour plates.

Auxiliary devices other than or in addition to optical assemblies may be attached externally or held in cavities in the contour plates, such as lights, timers, writing implements, microprocessors, liquid containers, food containers, first aid containers, fishing implements, cameras, clocks, compasses, levels and directions devices.

The preferred shape of each of the optical housing assemblies is in the form of an L-shape box, with each housing formed of opposing two shell halves. Mating shell halves can be assembled prior to any other assembly step. In second step, the mated shells can be slid and snapped onto the intermediate plate. All the optical components can then preferably be assembled from the outside of the optical assembly shell halves after the initial assembly.

The eyepiece holders are inserted into cooperating openings in the contour plates that lock and unlock the eyepiece holder so that the holders can be slid inwardly and user to focus the optical system. The eyepiece holders hold ocular optical components, comprising eye and field lenses which are held in its tubular holder housing and snap into place.

In the preferred embodiment, the fixed mirror mounts in the housing shell units are all the same. They include first and second reference surfaces for bearing against a mirror face. A second surface is spaced from the first and second reference surfaces and is positioned parallel thereto for receiving a mirror between the surfaces. A clip is connected to the second surface. The clip has a resilient arm. A keeper is connected to the resilient arm for overlying an end of the mirror after the mirror has been inserted between the parallel surfaces. Preferably the clip has a sloped camming face for lifting the arm as a mirror is slid beneath the clip and between the reference surfaces and the opposed surface. In a preferred embodiment, the clip has a second abutment for pressing against a back of the mirror and urging the mirror towards the reference surfaces. Preferably a second clip near the second reference surface has a resilient arm and a sloped face for lifting the second clip by a leading edge of the mirror. The second clip has a second abutment for resting against a back of the mirror and urging the mirror towards the reference surface.

The preferred eyepiece lens holder has side walls and first and second open ends. A first set of opposite openings is positioned near the first open end, and a second set of opposite openings is positioned near the second opposite end. An eyepiece inward extension in the second opposite end prevents movement of a lens with tabs which project through the second set of openings. A recess within the first end prevents further inward movement of another lens with tabs that project through the first set of openings. The holder has outward extending flanges on the second end. An eyepiece has an inner groove for receiving the flanges and holding the eyepiece on the holder. Outer surfaces of the holder have flat parallel surfaces for engaging surfaces of a receiver and holding the holder aligned with the receiver.

These and further and other objects and features of the invention are apparent in the disclosure, which includes the above and ongoing written specification, with the claims and the drawings.

BRIEF DESCRIPTION OF THE DRAWINGS

FIGS. 17 and 18 are cross-sectional details of the horizontal mirror mounts, showing the integrally molded members and the mirrors mounted within the integrally molded members;

FIGS. 19, 20, 21 and 22 are orthographic projections of an eyepiece holder, showing respectively a cross-sectional top view, an end view, a top view and a side elevation;

FIG. 23 is a perspective view of preferred optical assemblies slid together on an intermediate plate;

FIG. 24 is a perspective view of the assemblies of FIG. 23 slid apart on the intermediate plate;

DETAILED DESCRIPTION OF THE DRAWINGS

Figure 1:
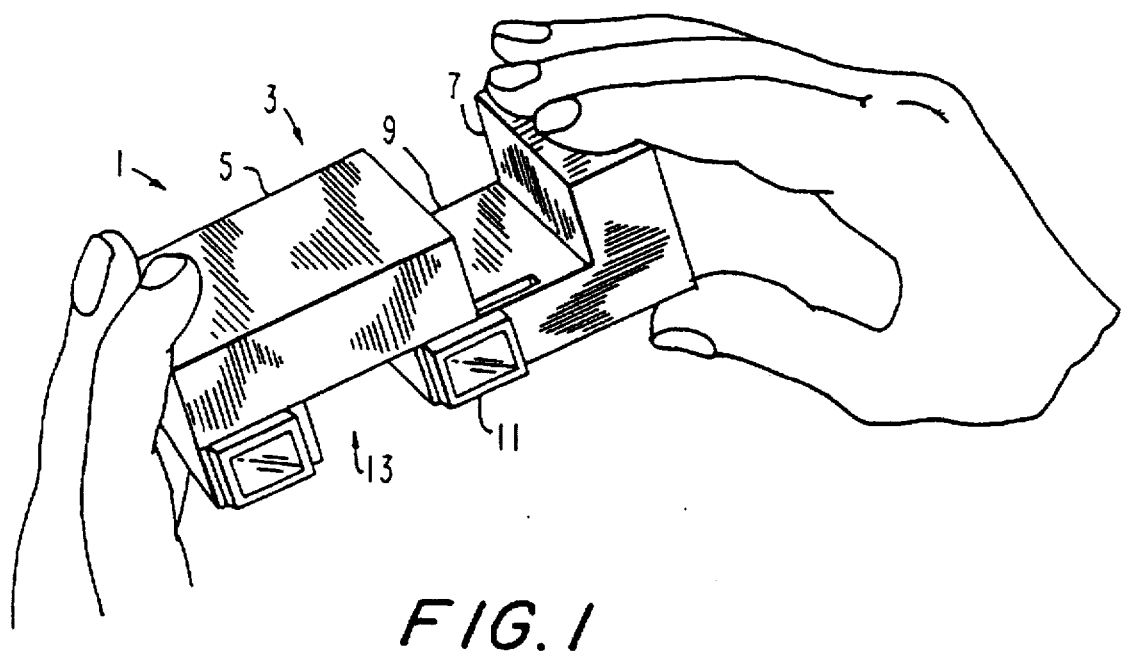
FIG. 1 shows a perspective view of the preferred form of the horizontally extended optical assemblies joined by an intermediate plate in the ready-to-use position.
Figure 2:
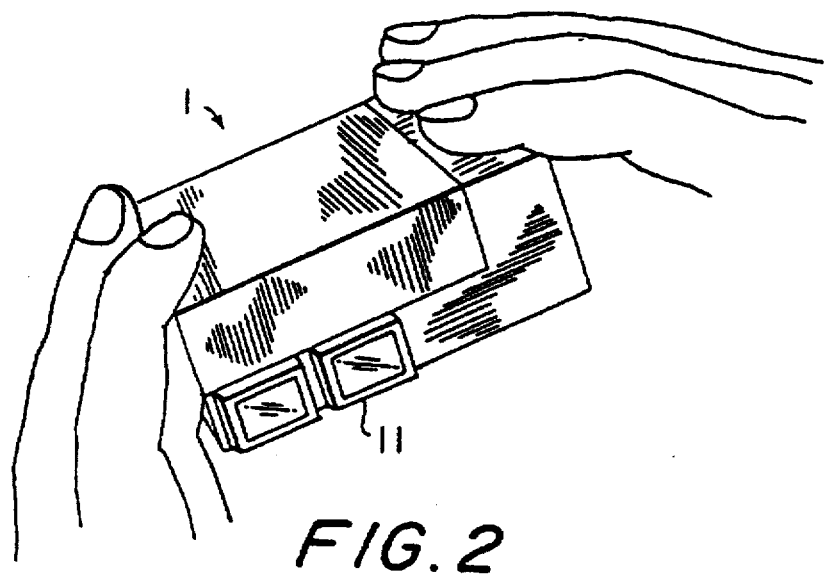
FIG. 2 shows the assemblies and intermediate plate of FIG. 1 in its compact carrying mode.

Referring to FIGS. 1 and 2, a preferred form of the binocular is generally indicated by the numeral 1. The binocular has a two-part slidable housing generally indicated by the numeral 3. The housings comprise interfitting L-shaped assemblies 5 and 7, which are connected by an intermediate plate 9. A pair of eyepieces holders 11 extend rearward from the eyepiece holders 71 at the back of assemblies 5 and 7.

Each optical assembly is created to have exactly the correct interlens distance and to provide correct interocular spacing of the eye pieces.

As shown in FIG. 1, the optical assemblies 5 and 7 are slid apart on the intermediate plate 9, providing a space 13 for a nose of the user and spacing the eyepieces 11 apart an appropriate interocular distance to provide optical alignment with eyes of a user. The intermediate plate 9 maintains rigidity of the extended structure, while frictionally holding the extended structure in selected position, and maintaining precise parallel alignment of the optics.

FIG. 2 shows the assemblies slid into closed position.

Figure 3:
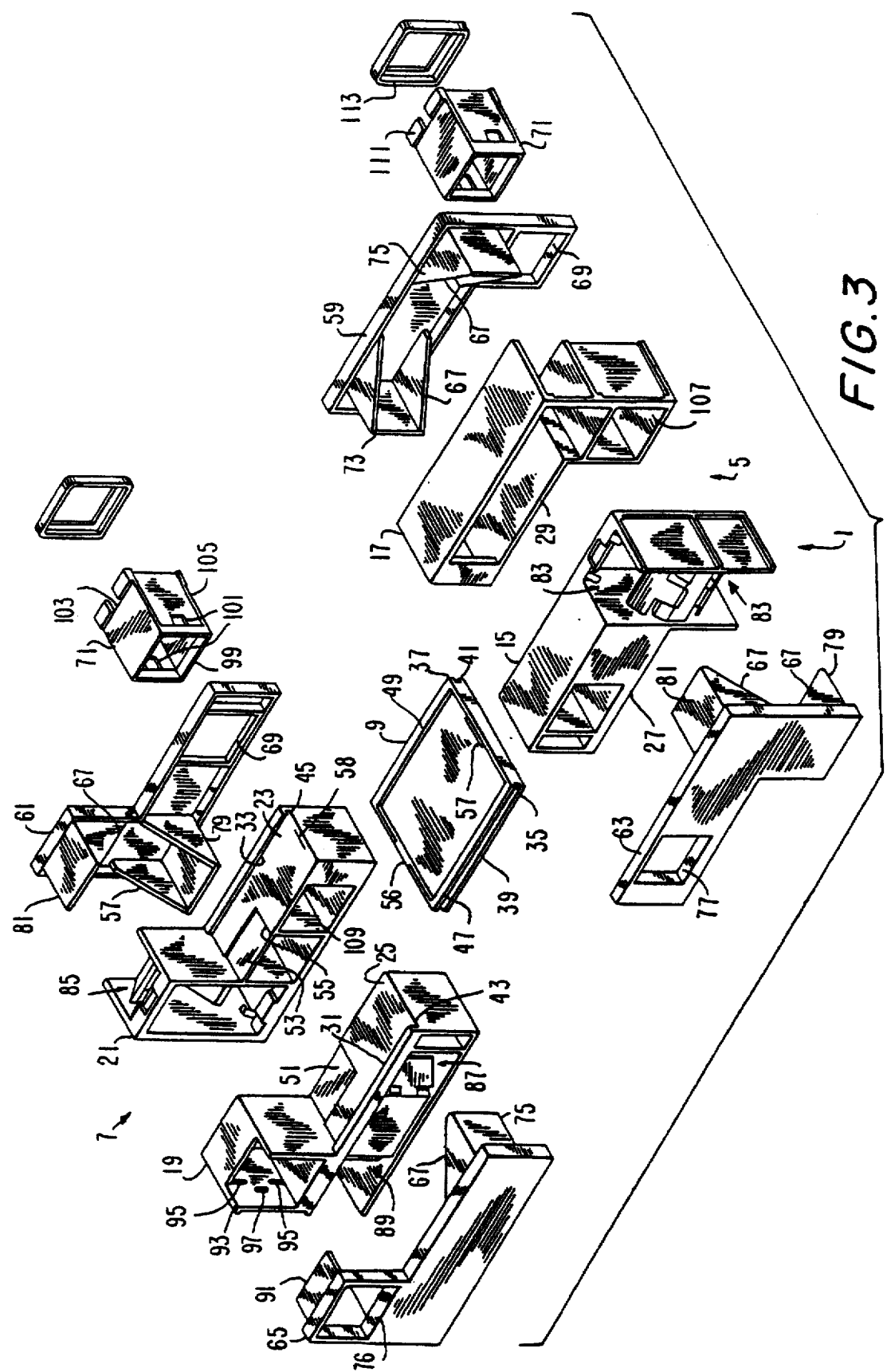
FIG. 3 is an exploded perspective view of the assemblies and intermediate plate components of the binocular of FIGS. 1 and 2, absent the optical elements.

FIG. 3 shows the interrelated parts of the binocular 1 before assembly. The optical elements of binocular 1 have been omitted from FIG. 3 (and FIG. 4) for a clearer depiction of the housing features, but as will be seen, comprise an objective lens, four mirrors, which perform erecting functions, and a two-element eyepiece for each assembly, 5 and 7. The optical assembly 5 is made of two shells 15 and 17, which are abutted and joined together along edges by bonding, welding, snapping or mechanical interfitting. Assembly 7 is similarly made up of a front shell 19 and a rear shell 21.

Intermediate plate 9 is optimally made from a stiff injection molded plastic. It may alternatively be made by machining a material or by extruding plastic or metal. Intermediate plate 9 is laid on the flat upper surfaces 23 and 25 of the shells 19 and 21 before or after they are joined. The lower flat surfaces 27 and 29 of shells 15 and 17 are laid on the intermediate plate 9 before or after those shells are jointed. Thus the intermediate plate 9 is trapped between the shells of the left and right assemblies. Inward facing rails 31 and 33 on assembly 7 engage the lower halves of grooves 35 and 37 on edges of the intermediate plate 9. Rails 39 and 41 of the intermediate plate extend respectively into grooves 43 and 45 beneath the rails 31 and 33 on shells 19 and 21. The upper rails 47 and 49 of the intermediate plate 9 fit within recesses beneath inward projecting rails on lower edges of the shell sections 15 and 17. Recesses 51 and 53 fit together, forming a wall 55 which restricts movement of a projection 56 at the end of the underside of intermediate plate 9. A similar projection 57 on the top of the plate cooperates with a similar wall at the end of a similar recess on the underside of elements 15 and 17 to limit outward interocular adjustment of the assemblies.

Figure 5:
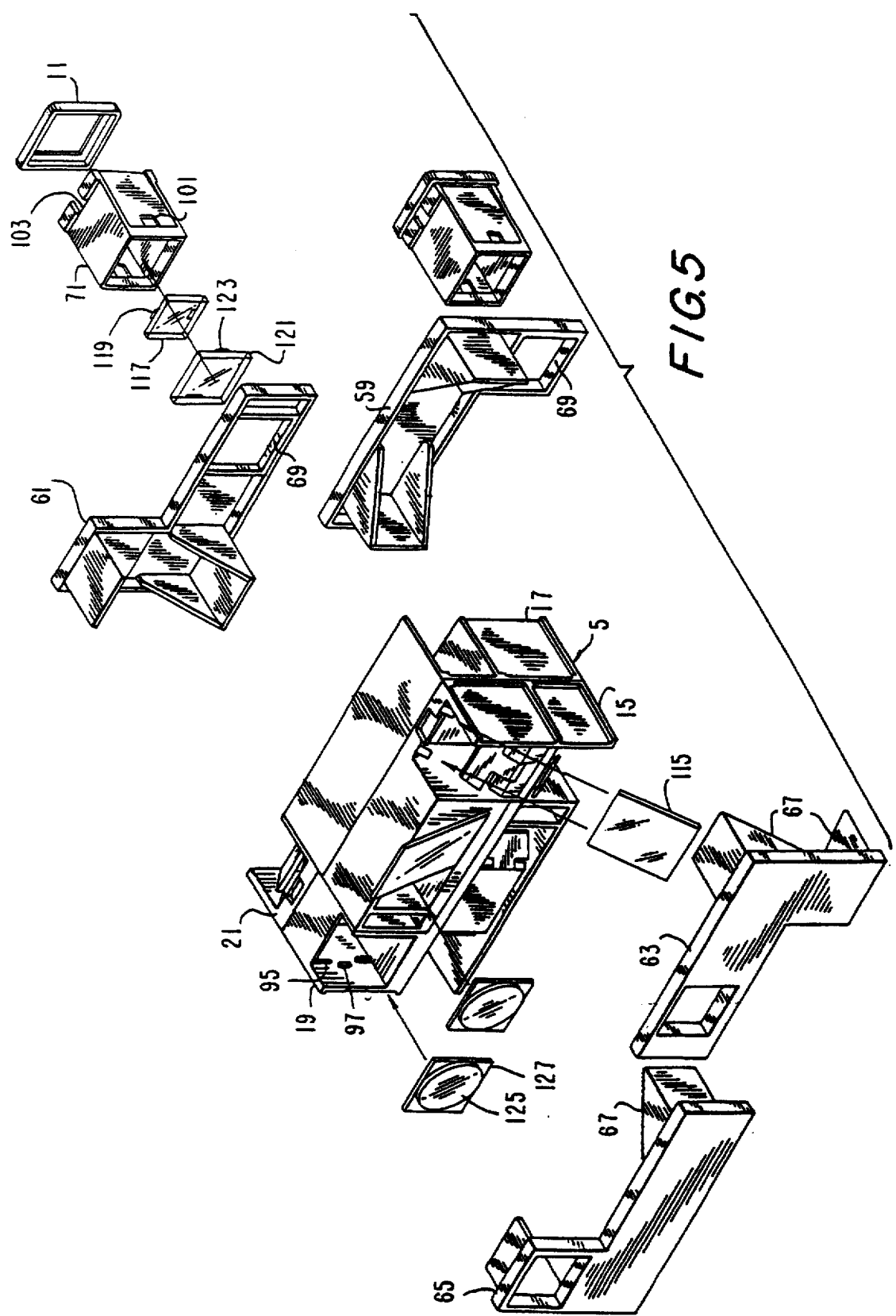
FIG. 5 is an exploded perspective view of the binocular of FIGS. 1 through 4 showing its optical components in combination with the major housing components.

After the shells have been connected to the intermediate plate 9 and secured together, the binoculars are completed, as shown in FIG. 5, by systematically inserting mirrors 115 and lenses and assembling the optical elements. Forward facing mirrors are first inserted in the back of the assemblies. Contour plate 59 is added as a rear contour plate of the optical assembly 5. Contour plate 61 is similarly added as a rear contour plate cover of the optical assembly 7. The contour plates can be formed by means of injection molding, vacuum forming blow molding, die cutting, casting, machining both thermoplastic and thermoset resins, monomers and polymers. Either soft or hard materials can be used and the contour plates can be formed from flexible or stiff materials.

The rear facing edge surfaces of the shells are bonded, welded or mechanically snapped to the forward facing edge surfaces of the rear contour plates 59 and 61. Then rearward facing mirrors are placed in the front of optical housings 5 and 7. The objective lenses are placed in the optical assemblies 5 and 7, and the front contour plate covers 63 and 65 are added.

Contour plates 59, 61, 63 and 65 have openings for optics and have rigid triangular box-like projections with edges 67 which rest against edges of backs of the mirrors and hold the mirrors in precise positions within the optical assembly shells.

Rear contour plate 59 has an opening 69, through which eyepiece holder 71 slides. The two triangular box-like projections 73 and 75 support angled mirrors which have a horizontal light path between the mirrors in shell 17. Edges 67 contact the mirrors. Contour plate 63 has an opening 77, which provides visual access to the optic path and to the objective lens mounted in shell 15. Rigid box-like triangular structures 79 and 81 have edges 67, which rest against the mirrors mounted in holders 83 in shell 15. Those mirrors have a vertical light path. Rear contour plate 61 has similar triangular box-like sections 79 and 81, with sloped edges 67 which rest against vertical light path mirrors held in mirror mounts 85 in shell 21. An opening 69 allows the inward sliding of an eyepiece lens holder 71. Front contour plate 65 has triangular box-like projections 75 and 76, with edges 67 which support mirrors in mounts 87 and 89 in shell 19. A projection 91 extends rearward from the light path opening 77 in contour plate 65 to cover the opening 93 in the shell after an objective lens is inserted between fixed holders 95 and 97. The holders 95 and 97 hold edges of an objective lens and allow the lens to be moved vertically for precise optical path adjustment before the lens is fixed in place, such as by bonding.

The eyepiece holders 71 have openings 99, through which field lenses and ocular lenses are inserted. Openings 101 and 103 hold tabs which project from the lens. Surfaces 105 are constructed without taper for engaging inner surfaces of the rectangular openings 107 and 109. Flanges 111 snap into grooves 113 in eyepieces 11. Outer surfaces of the holders 71 have zero degrees draft and contact inner surfaces 107, 109 of the corresponding optical assembly shells, thus insuring consistent reference surfaces. The surfaces of such contact have zero degrees moved in and draft, so that the optical path axis remains constant when the eyepiece holder 71 is out along its optical axis for automatic pre-focusing during assembly or by the consumer during use.

Figure 4:
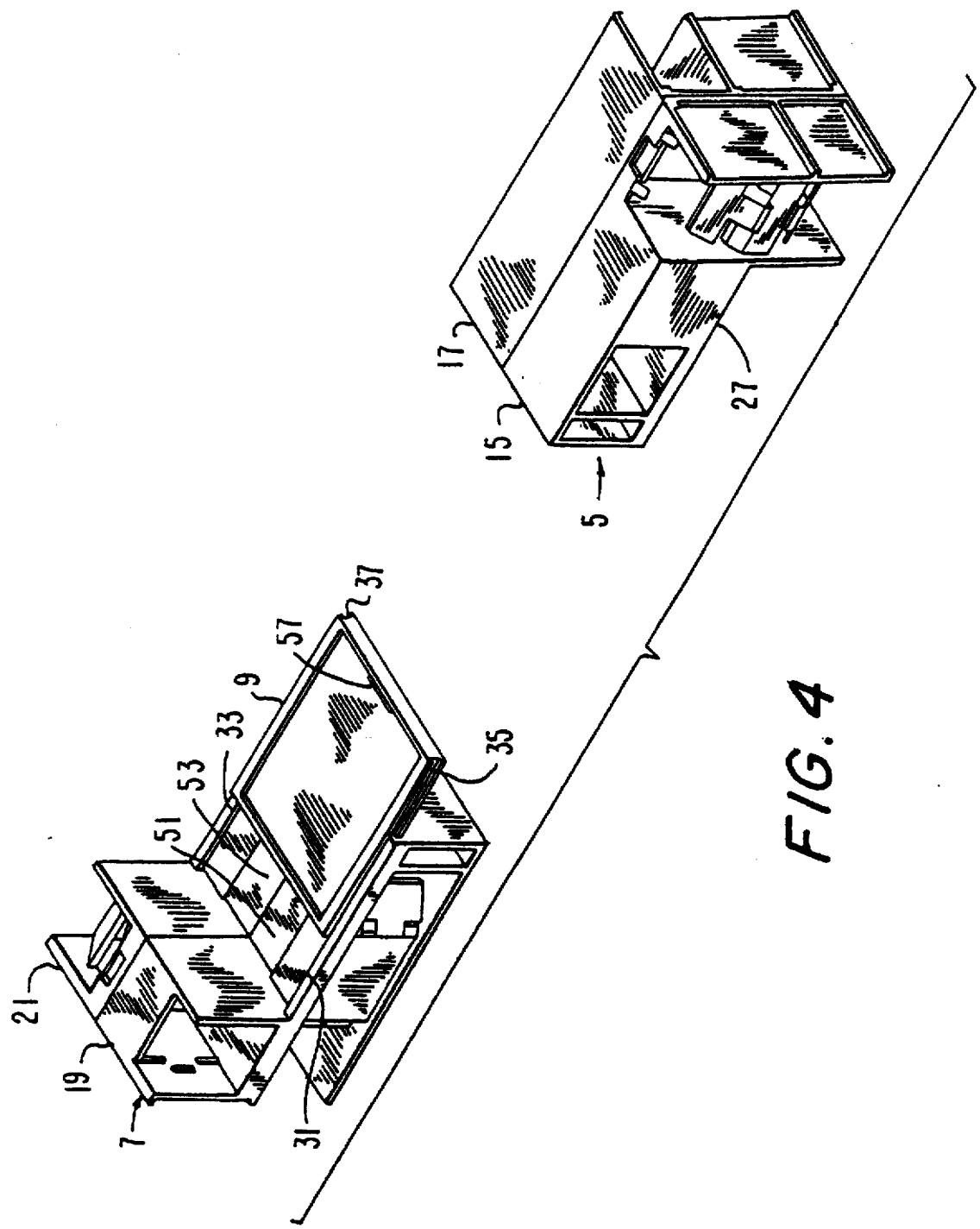
FIG. 4 is an exploded perspective view which shows the two monocular optical assemblies with missing parts but ready for connection with the intermediate plate for adjusting the interpupillary distance.

FIG. 4 shows the initial assembly steps in which shells 15 and 17 are bonded, welded or snapped together and shells 19 and 21 are bonded, welded or snapped together in permanent interconnection, and in which the intermediate plate 9 engages the rails 31 and 33 on the flat surface of the assembly 7. Similar inward facing rails are mounted on the lower surfaces 27 and 29 of the shells in assembly 5 engage the grooves 35 and 37 in the intermediate plate above the rails 31 and 33. Detent 57 snaps into position in a recess similar to the recesses 51 and 53 in assembly 7. Walls 55 cooperate with the detents 57 to limit outward extension detents 57 snap into grooves 58, as shown in FIG. 3, to hold the assemblies together when stored.

FIG. 5 depicts subsequent steps of inserting the lenses 71 and 125, mirrors 115 and connecting contour plates 59, 61, 63, 65 after the optical assemblies 5 and 7 have been joined.

Four mirrors similar to mirrors 115 are placed in the rear shells 17 and 21. Shell 17 receives mirrors with a horizontal intermediate light path, and shell 21 receives mirrors with a vertical intermediate light path. The contour plates 59 and 61 are then bonded, welded or snapped to rearward edges of shells 17 and 21. Two mirrors in addition to mirrors 115 are slid into place in shells 15 and 19. Shell 15 receives the mirrors with a vertical intermediate light path, and shell 19 receives the mirrors with a horizontal intermediate light path.

Ocular lenses 117 with projections 119 are slid into eyepiece holders 71. Tabs project from openings 103. Then the eyepiece 11 are inserted on the holders. Field lenses 121 with projecting tabs 123 are inserted in eyepiece holders 71. The tabs 123 extend through the openings 101. The lenses are fixed in place by a bonding or snapping into place or mechanically holding the lenses and tabs in place. Then the eyepiece holders are pushed through openings 69 into the rectangular recesses in shells 17 and 21. Objective lenses 125 with integral frames 127 are positioned between the holders 95 and 97. The lenses are positioned precisely in optical alignment and are bonded or otherwise fixed in place. Finally the front contour plates 63 and 65 are added. The edges 67 of the triangular box-like projections contact rear edge surfaces of the mirrors 115 and tightly holder the mirrors against fixed reference surfaces in the shells.

Figure 6:
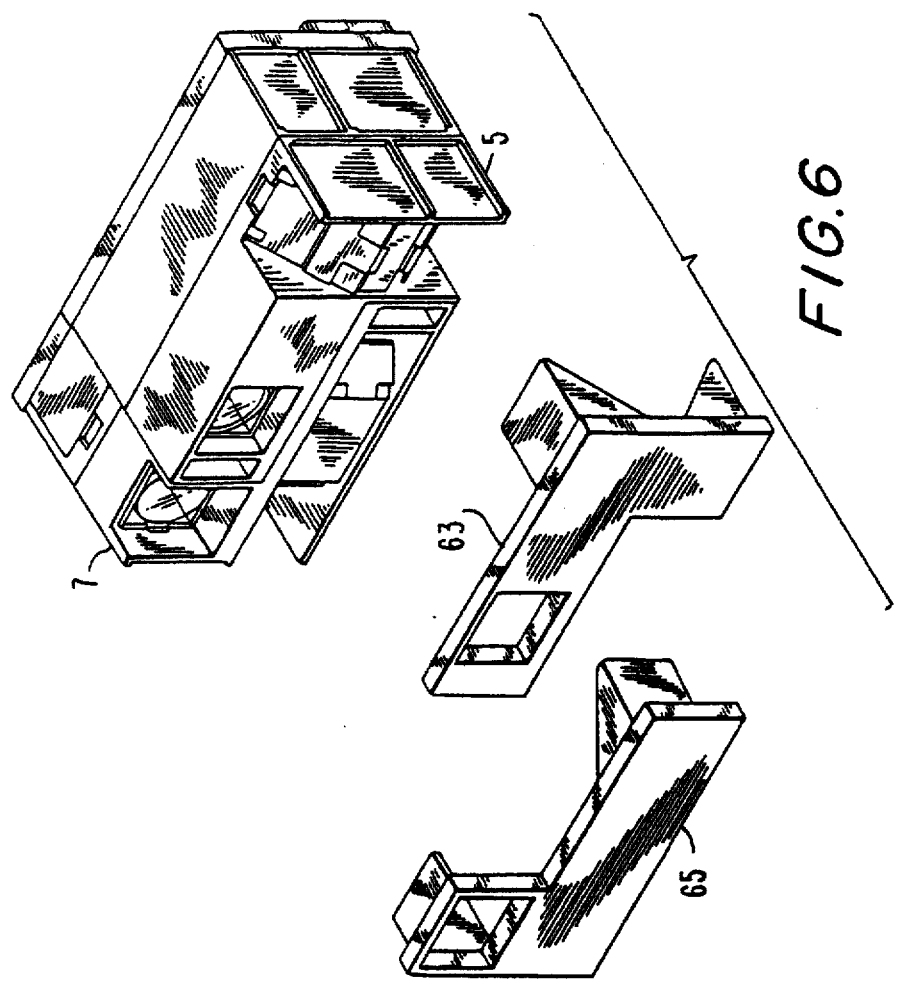
FIG. 6 is a perspective view showing the final assembly of the front contour plates.

FIG. 6 shows the final assembly step in which the front contour plates 63 and 65 are added to the otherwise completed assemblies.

Figure 7:
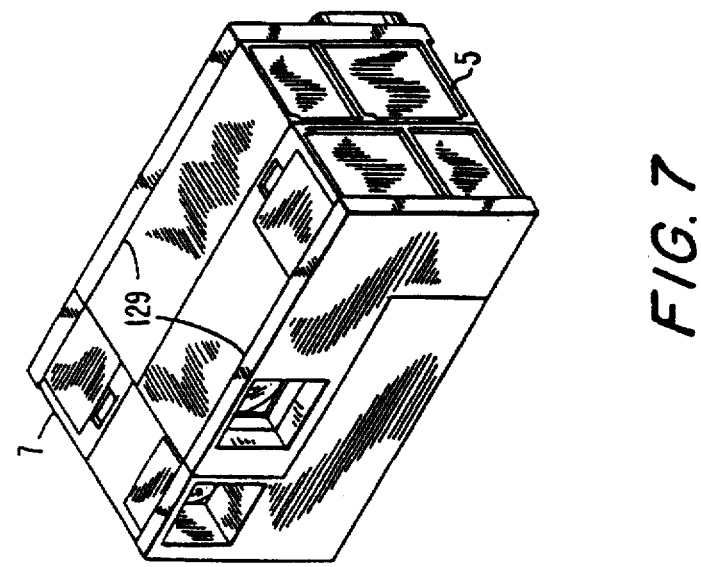
FIG. 7 is a perspective view of the assembled binocular without the skin or graphics, in its compact, or stored, condition.

FIG. 7 shows the completed binocular. The contour plates 59, 61, 63 and 65 preferably have lips 129 which extend inward to trap edges of wraps or skins (not shown) which extend around each assembly 5 and 7. Thus, it is relatively easy to customize the outer housing aesthetics.

Figure 9:
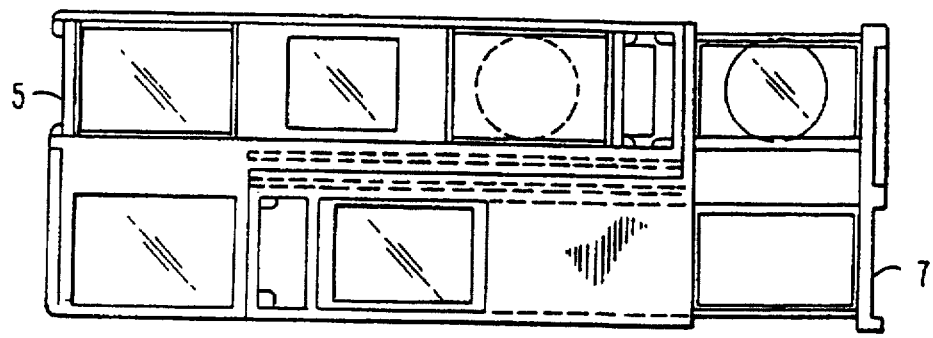
FIG. 9 is an elevation view of the optical assemblies slid together for carrying.
Figure 8:
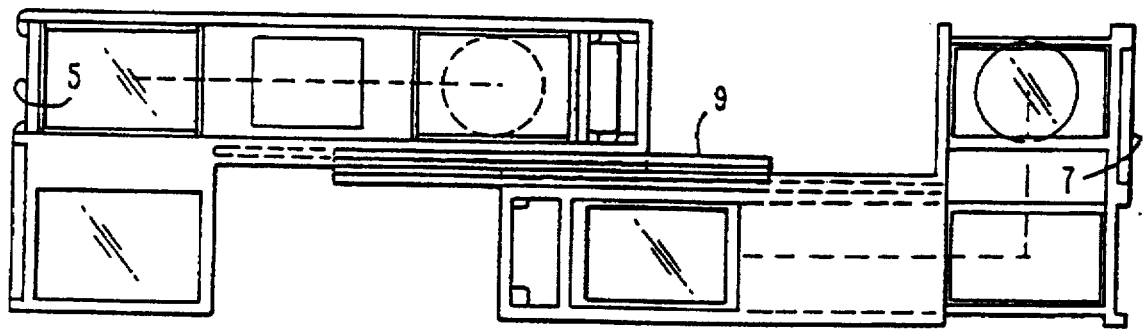
FIG. 8 is an elevation view of the connected and extended optical assemblies.

FIG. 8 shows the assembled elements in expanded condition, and FIG. 9 shows the binocular in its, compact stored position.

Figure 11:
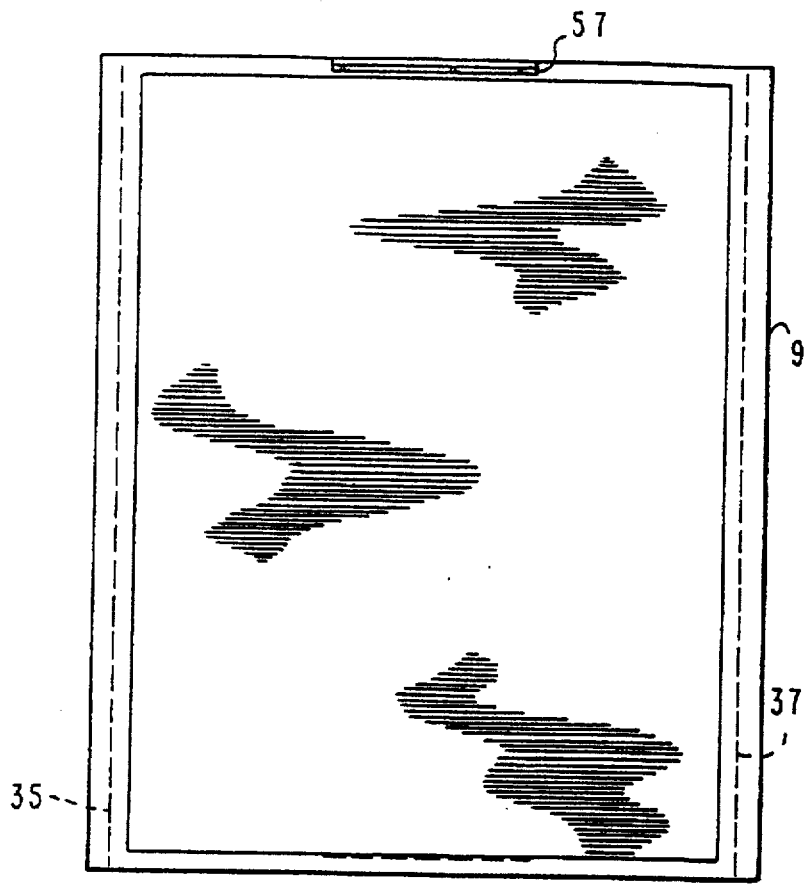
FIGS. 10, 11 and 12 are orthographic views of an intermediate plate, a side elevation, a top plan and an end elevation, respectively.
Figure 10:
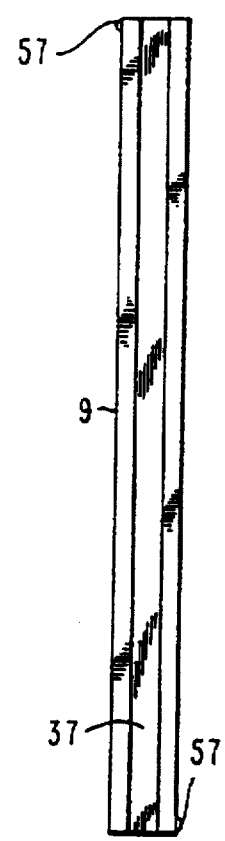
Figure 12:
Figure 13:
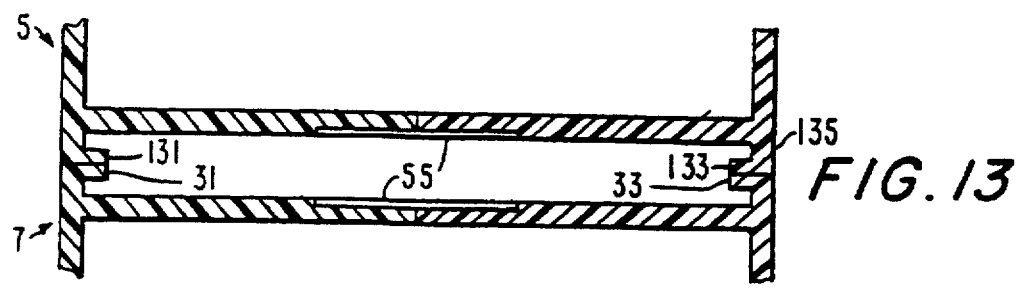
FIG. 13 is a detail for the juxtaposition of the optical assemblies.

FIGS. 10, 11 and 12 are details of the intermediate plate, and FIG. 13 shows the rails 31 and 33 on the optical assembly 7, the complementary rails 131 and 133 on the optical assembly 5 which are joined along facing surfaces 135. These parts fit together with a frictional interface and which are held together by the grooves 35 and 37 between the outward extending rails on the intermediate plate 9.

The projections 57 on ends of the intermediate place engage the walls 55 of the recesses to prevent overextension of the optical assemblies 5 and 7.

Figure 14:
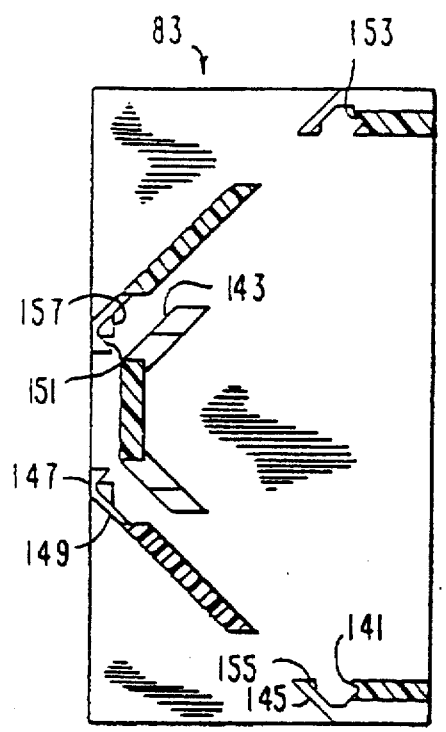
FIG. 14, 15 and 16 are cross-sectional details of vertical mirror mounts, showing the integrally molded parts, the sliding of the mirrors into the molded parts and the holding of the mirrors, respectively.
Figure 16:
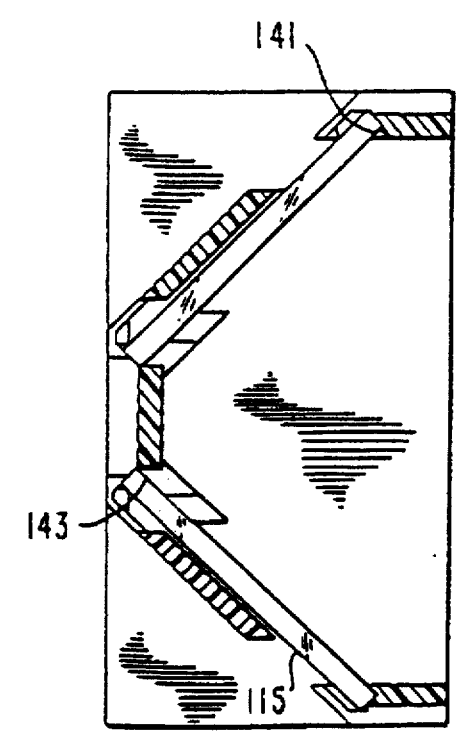
Figure 15:
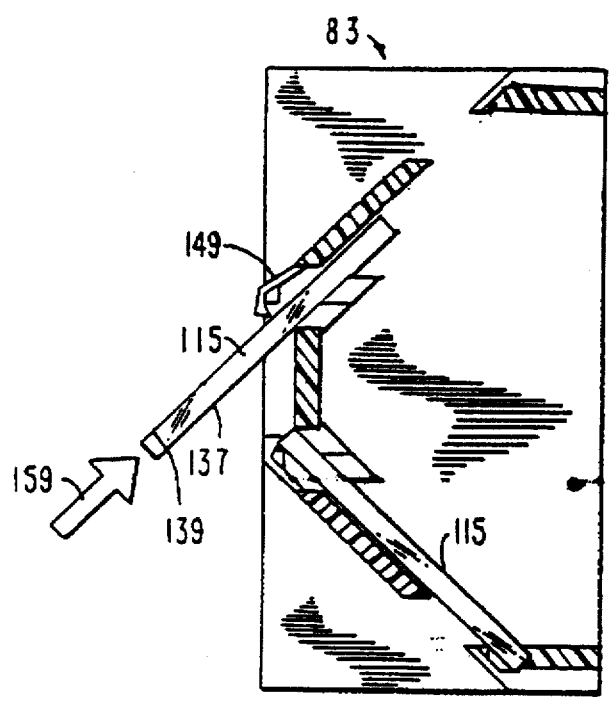
Figure 25:
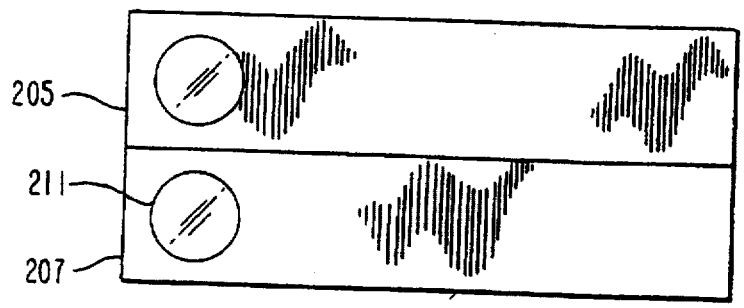
FIG. 25 is a rear elevation showing the optical assemblies slid together for storing and carrying.
Figure 26:
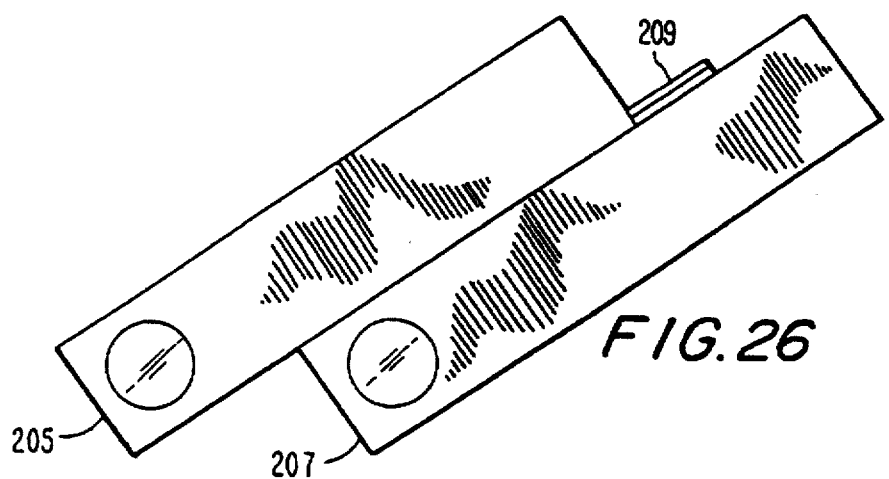
FIG. 26 is a rear elevation of the optical assemblies slid apart and canted to form a nose opening.
Figure 27:
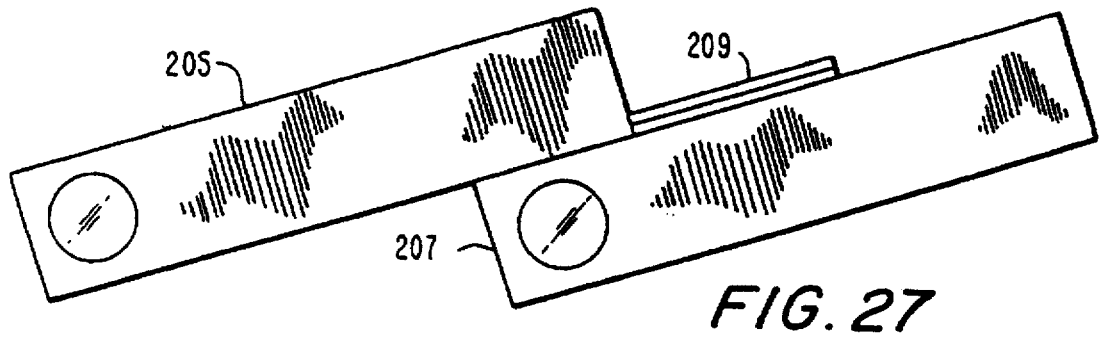
FIG. 27 is a rear elevation showing the optical assemblies slid apart to a greater distance and canted to a lesser degree to accommodate a person having a larger interocular spacing.

FIGS. 14, 15 and 16 are details of the mounting assemblies 83 for mirrors 115. Similar mounting assemblies mount the forward facing mirrors in mount 85, as shown in FIG. 3. The mirrors have transparent faces 137 and reflective coatings 139. Edges of the faces 137 of the mirror are held against reference surfaces 141 and 143 by clips 145 and 147. Clips 147 have arms 149 that flex, and grippers 151 which grip the end of the mirrors and prevent outward sliding and which hold the mirrors against seat 153. Supports 155 and 157 on clips 145 and 147 rest against the backs of the mirrors, urging the mirrors towards reference surfaces 141 and 143.

The mirrors are inserted in a direction shown by arrow 159, and once inserted and held in place by grippers 151. The edges 67 of the triangular box-like projections of the contour plates rest against the backs of the mirrors when the contour plates are assembled on the shells, further holding the mirrors against the fixed reference surfaces.

FIG. 14, shows the mirror mounting structure 83 before the mirrors are inserted.

FIG. 15 shows the mirror mounting structure with one mirror inserted and a second mirror being inserted.

FIG. 16 shows the structure with both mirrors inserted. The structure shown in FIGS. 14, 15 and 16 is similar to the mounting structure 85 in the shell 21, as shown in FIG. 3.

FIGS. 17 and 18 show the horizontal mounting structures 87 and 89 for mirrors 115, which have a horizontal light path extending between the mirrors. Elements in FIGS. 17 and 18 which are similar which are similar to elements in FIGS. 15 and 16 have similar numbers. It can be seen that the mirrors are inserted by bending the legs 149 outward when the leading edges of the minor encounter the ramp edges 161 of the clips 147 and 145. The mirrors are held against reference surfaces 141 and 143 by the ribs 155 on clips 145, and ribs 157 on clips 147, and further are held against the reference surfaces by the edges 67 of the triangular box-like projections on the contour plates.

Projections 163 snap into complementary recess in the contour plates.

FIGS. 19 through 22 show eyepiece lens holder 71 in which the side faces 165 are formed in three levels. They are the no-draft edge surfaces 105, the middle recessed surface 167, and the intermediate tapered surfaces 169. Ledges 171 are provide near the eyepiece in 173 to prevent rearward movement of the ocular lens. The tabs of the ocular lens re held in the openings 103 Edge 175 locates and prevents inward travel of the field lens edges. Openings 101 receive the outward extending tabs on the field lens. The flanges 111 connect with interior grooves in the eyepieces. The eyepieces may be placed on the flanges either before or after the insertion of the ocular lenses.

FIGS. 23 through 27 show a binocular 201 with a two-part housing 203 made of overlapped assemblies 205 and 207 sliding on intermediate plate 209. Eye piece holders 211 extend rearward from the assemblies. The internal optical element mounts, the lens mount and the mirror mounts are similar to those used in the assemblies 5 and 7. Multiple minors are installed to achieve an optical path.

The present invention produces highly compact optical and binocular housings with lightweight constructions, with precise, yet relatively inexpensive lens and mirror positioning features. The present invention provides precise sliding positioning of two optical assemblies with a minimum of weight and a maximum of accuracy in maintaining optical path alignment.

We claim:

1. A housing apparatus for an optical instrument, comprising a shell assembly having mirror mounts and an objective lens mount, and cover plates connected to the shell assembly, the cover plates having projections projecting into the shell assembly and engaging mirrors in the shell assembly, the shell assembly comprises first and second interconnected shells, the first shell having two mirror mounts for receiving angularly related mirrors, and the second shell having two mirror mounts for mounting two other angularly related mirrors, and the second shell having the objective lens mount for receiving an objective lens, the first shell further comprises a receiver for receiving an eyepiece holder, an eyepiece holder mounted on said receiver, the holder having a mount for receiving an ocular lens and a mount for holding a field lens, one of the cover plates comprises a rear contour plate connected to the first shell opposite the second shell, the rear contour plate having an opening for receiving the eyepiece holder, and having edges sealed to corresponding edges of the first shell for preventing ingress of light to the first shell, and the rear contour plate has projections which extend into the first shell for contacting backs of mirrors mounted in the first shell and supporting the mirrors against movement in said first shell.

2. The apparatus of claim 1, wherein all of the optical elements are insertable from outside of the shell.

3. The apparatus of claim 1, wherein the eye piece holder has flat, no-draft surfaces for sliding along flat surfaces of the receiver.

4. The apparatus of claim 1, wherein one of the cover plates comprises a front cover plate mounted on the second shell remote from the first shell, the front cover plate being sealed to the second shell for preventing ingress of light, the front cover plate having an opening aligned with the objective lens mount in the second shell, and the front cover plate having projections extending into the second shell for contacting backs of mirrors mounted in the second shell and holding the mirrors in position in the second shell.

* * * * *